US006987949B2

(12) United States Patent
Taniguchi et al.

(10) Patent No.: US 6,987,949 B2
(45) Date of Patent: Jan. 17, 2006

(54) WIRELESS MICROPHONE SYSTEM, VOICE RECEIVING APPARATUS, AND WIRELESS MICROPHONE

(75) Inventors: Shohei Taniguchi, Yokohama (JP); Kenji Matsumoto, Yokohama (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 417 days.

(21) Appl. No.: 10/283,446

(22) Filed: Oct. 30, 2002

(65) Prior Publication Data

US 2003/0087667 A1 May 8, 2003

(30) Foreign Application Priority Data

Oct. 31, 2001 (JP) ............................ 2001-334196

(51) Int. Cl.
*H04B 15/00* (2006.01)

(52) U.S. Cl. .......................... 455/62; 455/702; 455/42; 361/61

(58) Field of Classification Search ................ 455/410, 455/411, 62, 42, 458, 702, 66; 348/148; 381/61; 725/5; 361/61
See application file for complete search history.

(56) References Cited

U.S. PATENT DOCUMENTS

| | | | | |
|---|---|---|---|---|
| 4,882,773 | A | 11/1989 | Maloney | |
| 2002/0106089 | A1 * | 8/2002 | Zheng | 381/61 |
| 2002/0197957 | A1 * | 12/2002 | Kawasaki et al. | 455/42 |
| 2003/0036357 | A1 * | 2/2003 | McGowan | 455/62 |
| 2003/0041325 | A1 * | 2/2003 | Nathan et al. | 725/5 |
| 2003/0052970 | A1 * | 3/2003 | Dodds et al. | 348/148 |
| 2004/0190238 | A1 * | 9/2004 | Hubbard | 361/683 |

FOREIGN PATENT DOCUMENTS

| | | | |
|---|---|---|---|
| JP | 410093449 A | * | 9/1996 |
| JP | 10-93449 | | 4/1998 |

OTHER PUBLICATIONS

Patent Abstracts of Japan vol. 012, No. 385 (E-668), Oct. 14, 1988 & JP 63 128810A (Sanyo Electric Co. Ltd), Jun. 1, 1988.

Rohde N et al: “Kuenstler an der Funkstrippe,” Funkschau, Franzis-Verlag K.G. Munchen, De, vol. 63, No. 8, Apr. 5, 1991, pp. 68-71, XP000225324, ISSN: 0016-2841.

* cited by examiner

*Primary Examiner*—Lester G. Kincaid
*Assistant Examiner*—Phuoc Doan
(74) *Attorney, Agent, or Firm*—Pearne & Gordon LLP

(57) ABSTRACT

Herein disclosed is a wireless microphone system comprising a plurality of wireless microphones each having a microphone storage area having a unique global identification element stored therein, each of the wireless microphones operative to collect a voice, convert the voice thus collected into an audio signal, and transmit the audio signal and the global identification element; and a voice receiving apparatus for receiving the audio signal and the global identification element from a wireless microphone. The voice receiving apparatus includes a storage section for storing an identification table including a plurality of local identification elements in association with a plurality of global identification elements. The voice receiving apparatus is operative to assign a local identification element to the wireless microphone in accordance with the global identification element with reference to the identification table stored in the storage section, and transmit the local identification element to the wireless microphone, and the wireless microphone is operative to receive the local identification element, store the local identification element in the microphone storage area, and communicate with the voice receiving apparatus with the local identification element thus stored.

11 Claims, 15 Drawing Sheets

2000

3000

4000

5000

WIRELESS MICROPHONE SYSTEM, VOICE RECEIVING APPARATUS, AND WIRELESS MICROPHONE

BACKGROUND OF THE INVENTION

1. Field of the Invention

The present invention relates to a wireless microphone system, a voice receiving apparatus, and a wireless microphone, and more particularly to, a multi-channel wireless microphone system comprising a voice receiving apparatus and a plurality of wireless microphones in a local communication area wherein the voice receiving apparatus is capable of communicating with each of the wireless microphones located in the local communication area without interfering with any one of them to ensure reliable communications.

2. Description of the Related Art

Up until now, there have been proposed a wide variety of wireless microphone systems, each comprising a wireless microphone for collecting a voice and converting the voice thus collected into an audio signal to be transmitted by means of radio wave, and a voice receiving apparatus for receiving the audio signal from the microphone, thereby making it possible for the voice receiving apparatus to receive the audio signal from the wireless microphone and eliminating the need of installing a cable for connecting the wireless microphone and the voice receiving apparatus. The voice receiving apparatus may be connected with, for example, a speaker for amplifying and outputting therethrough the voice thus collected and transmitted by the wireless microphone.

One typical example of the conventional wireless microphone system, hereinlater referred to as "first conventional wireless microphone system", is exemplified and shown in FIG. 14 as comprising two wireless microphones 901 and 903 each for collecting a voice, converting the voice thus collected into an audio signal, and transmitting the audio signal by means of radio wave on a microphone frequency channel, and two receiving apparatuses 902 and 904 each for receiving the audio signal. The voice receiving apparatus 902 is capable of receiving an audio signal by means of radio wave on a receiving frequency channel from a wireless microphone located within a local communication area L1 while, on the other hand, the voice receiving apparatus 904 is capable of receiving the audio signal by means of radio wave on a receiving frequency channel from a wireless microphone located within a local communication area L2. The wireless microphone 901 is located in the local communication area L1, and the wireless microphone 903 is located in both the local communications areas L1 and L2.

In the first conventional wireless microphone system thus constructed, the microphone frequency channel of the wireless microphone 901 located in the local communication area L1 and the receiving frequency channel of the receiving apparatus 902 may be manually set to a common frequency channel, for example, frequency channel $\alpha$, so that the wireless microphone 901 could communicate with the receiving apparatus 902. Similarly, the microphone frequency channel of the wireless microphone 903 located in the local communication area L2 and the receiving frequency channel of the receiving apparatus 904 may be manually set to a common frequency channel, for example, frequency channel $\beta$, so that the wireless microphone 903 could communicate with the receiving apparatus 904.

The first conventional wireless microphone system, however, encounters a problem that the wireless microphone 903 located in both the local communication areas L1 and L2 cannot communicate with the receiving apparatus 902 while, on the other hand, the wireless microphone 903 can communicate with the receiving apparatus 904 on the frequency channel $\beta$ unless the microphone frequency channel of the wireless microphone 903 and the receiving frequency channel of the receiving apparatus 902 are manually set to a common frequency channel. The radio wave transmitted by the wireless microphone 903 located in both the local communication areas L1 and L2 and communicating with the receiving apparatus 904 may be recognized by the receiving apparatus 902 as extraneous radio wave and cause a harmful interference with the receiving apparatus 902.

Another conventional wireless microphone system, hereinlater referred to as "second conventional wireless microphone system", is exemplified and shown in FIG. 15 as comprising a plurality of wireless microphones, for example, wireless microphones 911 to 918 each for collecting a voice, converting the voice thus collected into an audio signal, and transmitting the audio signal by means of radio wave on a microphone frequency channel and a receiving apparatus 900 for receiving the audio signal. The wireless microphones 911 to 918 are located in a local communication area L3, and the voice receiving apparatus 900 is capable of receiving an audio signal by means of radio wave on a receiving frequency channel from a wireless microphone located within the local communication area L3.

In the second conventional wireless microphone system thus constructed, the microphone frequency channel of the wireless microphone 911 and the receiving frequency channel of the receiving apparatus 900 may be manually set to a common frequency channel, for example, frequency channel $\alpha 1$, so that the wireless microphone 911 can communicate with the receiving apparatus 900. Similarly, the microphone frequency channel of the wireless microphone 912 and the receiving frequency channel of the receiving apparatus 900 may be manually set to a common frequency channel, for example, frequency channel $\alpha 2$, so that the wireless microphone 912 can communicate with the receiving apparatus 900. In this manner, the microphone frequency channels of the wireless microphones 911 to 918 and the receiving frequency channels of the receiving apparatus 900 may be manually set to respective common frequency channels, for example, frequency channels $\alpha 1$ to $\alpha 8$ so that the plurality of wireless microphone 911 to 918 can communicate with the receiving apparatus 900.

The second conventional wireless microphone system comprising a receiving apparatus and a plurality of wireless microphone encounters another problem that the microphone frequency channels of the wireless microphones 911 to 918 and the receiving frequency channels of the receiving apparatus 900 are required to be manually set to common frequency channels, i.e., respective frequency channels $\alpha 1$ to $\alpha 8$ so that the plurality of wireless microphone 911 to 918 can communicate with the receiving apparatus 900, thereby making it difficult to manage a plurality of wireless microphones in terms of frequency channels and easily causing harmful interferences with one another. The present invention contemplates resolution of such problems.

SUMMARY OF THE INVENTION

It is therefore an object of the present invention to provide a wireless microphone system comprising a voice receiving apparatus and a plurality of wireless microphones located in a local communication area wherein the voice receiving apparatus is capable of communicating with each of the wireless microphones located in the local communication area, which makes it easy to set the receiving frequency channel of the voice receiving apparatus to frequency channels common to the microphone frequency channels of the wireless microphones so that a plurality of wireless microphones could communicate with the voice receiving apparatus to ensure reliable communications, thereby enabling to manage a plurality of wireless microphones in terms of frequency channels and preventing harmful interferences from occurring.

It is another object of the present invention to provide a voice receiving apparatus capable of communicating with a plurality of wireless microphones located in a local communication area, which makes it easy to set the receiving frequency channel of the voice receiving apparatus to frequency channels common to the microphone frequency channels of the wireless microphones so that a plurality of wireless microphones could communicate with the voice receiving apparatus to ensure reliable communications, thereby enabling to manage a plurality of wireless microphones in terms of frequency channels and preventing harmful interferences from occurring.

It is a further object of the present invention to provide a wireless microphone capable of communicating with a voice receiving apparatus, which makes it easy to set the receiving frequency channel of the voice receiving apparatus to frequency channels common to the microphone frequency channels of the wireless microphones to ensure reliable communications, thereby preventing harmful interferences from occurring.

In accordance with a first aspect of the present invention, there is provided a wireless microphone system comprising: a plurality of wireless microphones each having a global identification element, each of the wireless microphones operative to collect a voice, convert the voice thus collected into an audio signal, and transmit the audio signal and the global identification element; and a voice receiving apparatus for receiving the audio signal and the global identification element from a wireless microphone. The voice receiving apparatus may include a global identification element registering section for registering the global identification element received from a wireless microphone, and a local identification element assigning section for assigning a local identification element to the wireless microphone in accordance with the global identification element. The wireless microphone may receive the local identification element from the voice receiving apparatus and communicate with the voice receiving apparatus with the local identification thus received.

In the aforesaid wireless microphone system, the local identification element assigning section may receive the global identification element from a wireless microphone and transmit the local identification element to the wireless microphone by means of infrared communication. Alternatively, the local identification element assigning section may receive the global identification element from a wireless microphone and transmit the local identification element to the wireless microphone by means of radio wave communication on a particular frequency.

In accordance with a second aspect of the present invention, there is provided a wireless microphone system comprising: a plurality of wireless microphones each having a microphone storage area having a unique global identification element stored therein, each of the wireless microphones operative to collect a voice, convert the voice thus collected into an audio signal, and transmit the audio signal and the global identification element; and a voice receiving apparatus for receiving the audio signal and the global identification element from a wireless microphone. The voice receiving apparatus may include a storage section for storing an identification table including a plurality of local identification elements in association with a plurality of global identification elements. The voice receiving apparatus may assign a local identification element to the wireless microphone in accordance with the global identification element with reference to the identification table stored in the storage section, and transmit the local identification element to the wireless microphone. The wireless microphone may receive the local identification element, store the local identification element in the microphone storage area, and communicate with the voice receiving apparatus with the local identification element thus stored.

In the aforesaid wireless microphone system, the wireless microphone may be removably attached to the voice receiving apparatus, and operative to transmit the global identification element directly to the voice receiving apparatus. The voice receiving apparatus may receive the global identification element from the wireless microphone, assign a local identification element to the wireless microphone in accordance with the global identification element with reference to the identification table stored in the storage section, and transmit the local identification element to the wireless microphone while the wireless microphone is removably attached to the voice receiving apparatus. The wireless microphone may receive the local identification element, store the local identification element in the microphone storage area, and communicate with the voice receiving apparatus with the local identification element thus stored. Alternatively, the wireless microphone may be removably connected with the voice receiving apparatus through a cable and operative to transmit the global identification element through the cable to the voice receiving apparatus. The voice receiving apparatus may receive the global identification element from the wireless microphone, assign a local identification element to the wireless microphone in accordance with the global identification element with reference to the identification table stored in the storage section, and transmit the local identification element to the wireless microphone through the cable. The wireless microphone may receive the local identification element, store the local identification element in the microphone storage area, and communicate with the voice receiving apparatus with the local identification element thus stored.

In the aforesaid wireless microphone system, the wireless microphone may be capable of communicating with the voice receiving apparatus by means of infrared communication, and operative to transmit the global identification element by means of infrared communication to the voice receiving apparatus. The voice receiving apparatus may receive the global identification element from the wireless microphone, assign a local identification element to the wireless microphone in accordance with the global identification element with reference to the identification table stored in the storage section, and transmit the local identification element to the wireless microphone by means of infrared communication. The wireless microphone may receive the local identification element, store the local identification element in the microphone storage area, and communicate with the voice receiving apparatus with the local identification element thus stored. Alternatively, the wireless microphone may transmit the global identification element on a predetermined frequency channel. The voice receiving apparatus may assign a local identification element to the wireless microphone in accordance with the global identification element with reference to the identification table stored in the storage section, and transmit the local identification element to the wireless microphone on the predetermined frequency channel. The wireless microphone may receive the local identification element, store the local identification element in the microphone storage area, and communicate with the voice receiving apparatus with the local identification element thus stored.

In the aforesaid wireless microphone system, each of the local identification elements included in the identification table stored in the storage section may correspond to a communicating frequency channel which a wireless microphone assigned to the local identification element uses to communicates with the voice receiving apparatus. The wireless microphone may receive the local identification element, store the local identification element in the microphone storage area, and communicate with the voice receiving apparatus with the local identification element thus stored on the communicating frequency channel corresponding to the local identification element. The voice receiving apparatus may judge whether or not the global identification element is included in the identification table stored in the storage section before assigning a local identification element to the wireless microphone in accordance with the global identification element, and refuse the line connection with the wireless microphone if it is judged that the global identification element is not stored in the storage section. The voice receiving apparatus may be capable of communicating with the wireless microphone in a local communication area, the local identification element included in the identification table stored in the storage section includes area information indicative of the local communication area. The voice receiving apparatus may judge whether the local identification element is valid or not with reference to the area information included in the local identification element and refuse the line connection with the wireless microphone if it is judged that the local identification element is not valid.

In accordance with a third aspect of the present invention there is provided a voice receiving apparatus for receiving an audio signal and a global identification element from a wireless microphone comprising a storage section for storing an identification table including a plurality of local identification elements in association with a plurality of global identification elements. The voice receiving apparatus may assign a local identification element to the wireless microphone in accordance with the global identification element with reference to the identification table stored in the storage section, and transmit the local identification element to the wireless microphone.

In accordance with a fourth aspect of the present invention, there is provided a wireless microphone comprising a microphone storage area having a unique global identification element stored therein for collecting a voice, converting the voice thus collected into an audio signal, and transmitting the audio signal and the global identification element. The wireless microphone may receive the local identification element, store the local identification element in the microphone storage area, and communicate with the voice receiving apparatus with the local identification element thus stored.

BRIEF DESCRIPTION OF THE DRAWINGS

The present invention and many of the advantages thereof will be better understood from the following detailed description when considered in connection with the accompanying drawings, wherein.

DESCRIPTION OF THE PREFERRED EMBODIMENTS

Figure 1:
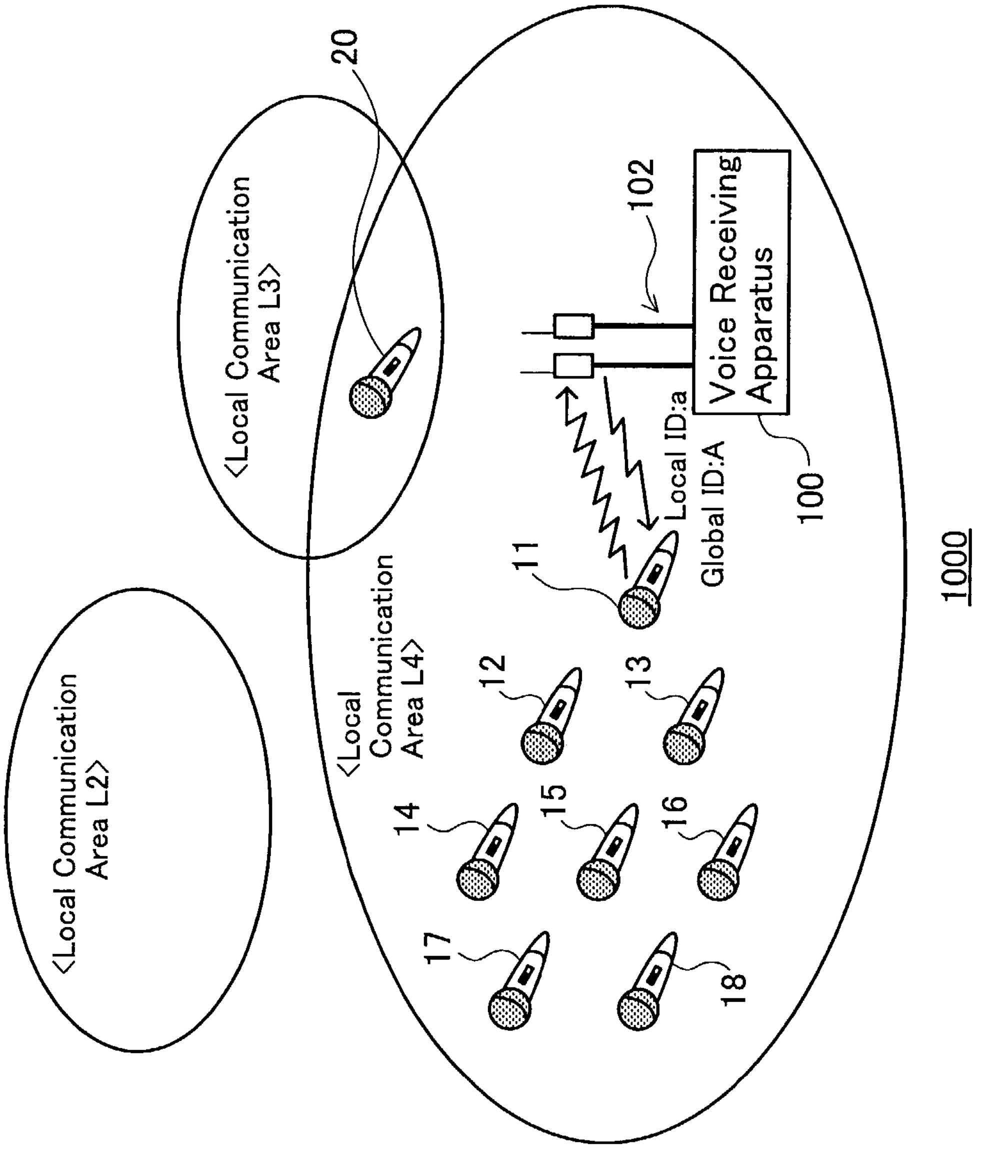
FIG. 1 is a schematic block diagram of a preferred first embodiment of the wireless microphone system according to the present invention.

The preferred embodiments of the wireless microphone system according to the present invention will be described hereinafter with reference to the drawings shown in FIGS. 1 to 13. Throughout the following detailed description, similar reference characters refer to similar elements in all figures of the drawings.

Figure 2:
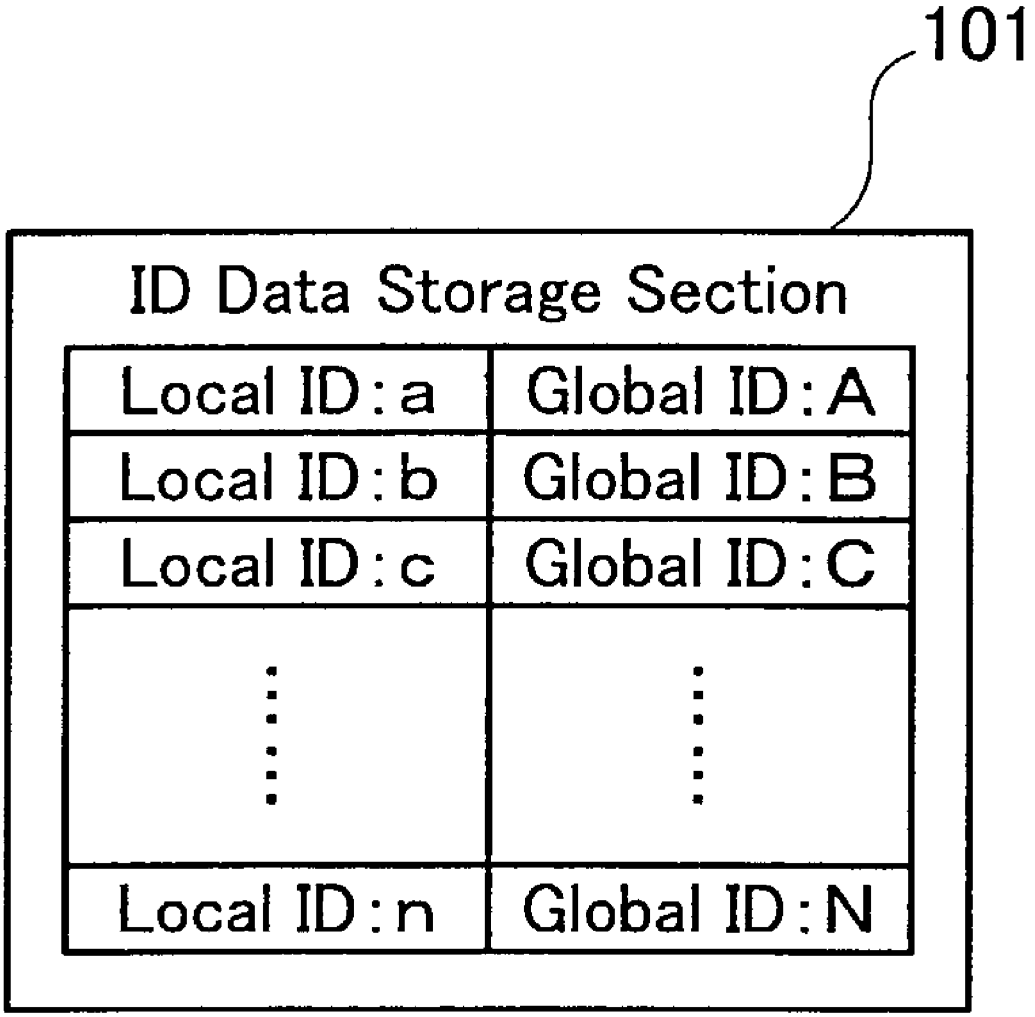
FIG. 2 is a block diagram of an identification table forming part of the wireless microphone system shown in FIG. 1.
Figure 3:
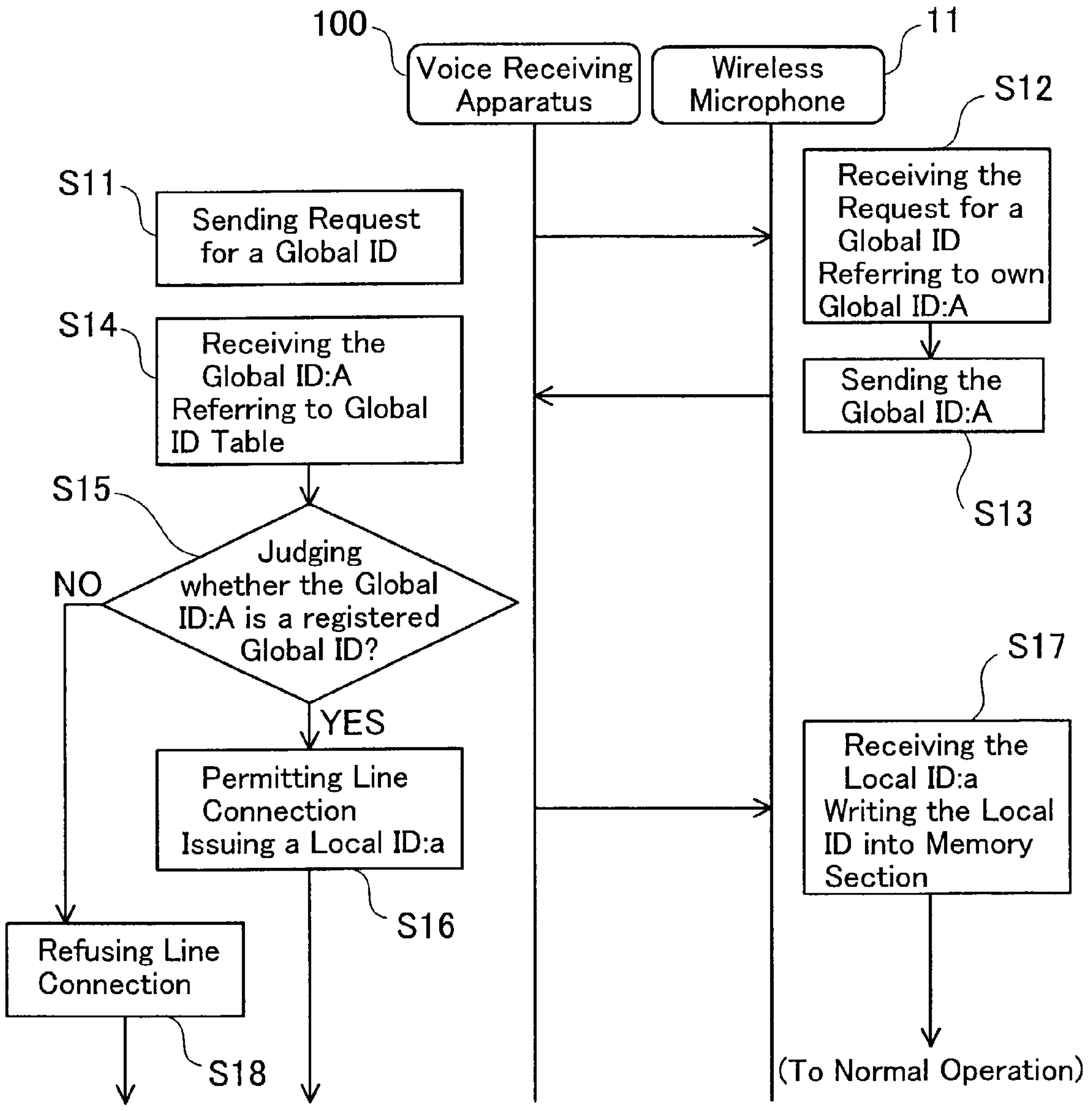
FIG. 3 is a flow chart showing a process performed in the wireless microphone system shown in FIG. 1.

Referring now to FIGS. 1 to 3 of the drawings, there is shown a first preferred embodiment of the wireless microphone system 1000 according to the present invention.

The first preferred embodiment of the wireless microphone system 1000 is shown in FIG. 1 as comprising a plurality of wireless microphones, for example, wireless microphones 11 to 18 and a voice receiving apparatus 100. Each of the wireless microphones 11 to 18 has a global identification element and adapted to collect a voice, convert the voice thus collected into an audio signal, and transmit the audio signal and the global identification element. The voice receiving apparatus 100 is adapted to receive the audio signal and the global identification element from any one of the wireless microphones 11 to 18.

The voice receiving apparatus 100 includes a global identification element registering section for registering a global identification element received from a wireless microphone 1-*i*, and a local identification element assigning section for assigning a local identification element to the wireless microphone 1-*i* in accordance with the global identification element, and the wireless microphone 1-*i* is operative to receive the local identification element from the voice receiving apparatus 100 and communicate with the voice receiving apparatus 100 with the local identification element thus received. The term "wireless microphone 1-*i*" herein used is intended to mean any one of the wireless microphones 11 to 18.

More specifically, each of the wireless microphones 11 to 18 has a microphone storage area having a unique global identification element stored therein, and adapted to collect a voice and convert the voice thus collected into an audio signal, and transmit the audio signal and the global identification element. The voice receiving apparatus 100 includes a storage section 101 for storing an identification table including a plurality of local identification elements in association with a plurality of global identification elements. Preferably, the identification table may include a plurality of local identification elements, for example, local ID: a to local ID: n, in association with a plurality of global identification elements, for example, global ID: A to global ID: N as shown in FIG. 2. Each of the local identification elements corresponds to a communicating frequency channel which a wireless microphone 1-*i* assigned to the local identification element uses to communicates with the voice receiving apparatus 100. The global identification element may be a unique identifier such as, for example, a production number. The voice receiving apparatus 100 is capable of communicating with wireless microphones located in a local communication area L1 with an antenna 102. The local identification element may be an identifier uniquely valid in the local communication area L1 of the voice receiving apparatus 100.

This means that the voice receiving apparatus 100 is operative to store a plurality of global identification elements in association with a plurality of local identification elements in the storage section 101. The process of storing a plurality of global identification elements in association with a plurality of local identification elements in the storage section 101 may be simply referred to as "registration of global identification elements". The global identification element registering section is operative to store a plurality of global identification elements in association with a plurality of local identification elements in the storage section 101. The storage section 101 partly constitutes the global identification element registering section according to the present invention.

The voice receiving apparatus 100 is operative to assign a local identification element to the wireless microphone 1-*i* in accordance with the global identification element with reference to the identification table stored in the storage section 101, and transmit the local identification element to the wireless microphone 1-*i*. The process of assigning a local identification element to the wireless microphone 1-*i* in accordance with the global identification element with reference to the identification table stored in the storage section 101, and transmitting the local identification element to the wireless microphone 1-*i* may be simply referred to as "registration of a local identification element" performed in the voice receiving apparatus 100. More specifically, the voice receiving apparatus 100 is operative to judge whether or not the global identification element is included in the identification table stored in the storage section 101 before assigning a local identification element to the wireless microphone 1-*i* in accordance with the global identification element. The voice receiving apparatus 100 is operative to refuse the line connection with the wireless microphone 1-*i* if it is judged that the global identification element is not stored in the storage section 101. The global identification element included in the identification table stored in the storage section 101 may be simply referred to as "a registered global identification element". The local identification element assigning section of the voice receiving apparatus 100 is operative to receive the global identification element from the wireless microphone 1-*i*, assign a local identification element to the wireless microphone 1-*i* in accordance with the global identification element with reference to the identification table stored in the storage section 101, and transmit the local identification element to the wireless microphone 1-*i*. The storage section 101 partly constitutes the local identification element assigning section according to the present invention.

The wireless microphone 1-*i* is operative to receive the local identification element, store the local identification element in the microphone storage area, and communicate with the voice receiving apparatus 100 with the local identification element thus stored on the communicating frequency channel corresponding to the local identification element. The process of transmitting a global identification element to the voice receiving apparatus 100, receiving a local identification element, and storing the local identification element in the microphone storage area may be simply referred to as "registration of a local identification element" performed in the wireless microphone 1-*i*.

The operation of the first embodiment of the wireless microphone system 1000 according to the present invention will be described with reference to the drawings shown in FIG. 3, hereinlater.

It is assumed that a wireless microphone, for example, wireless microphone 11, located in the local communication area L1, is operated to transmit a signal and the voice receiving apparatus 100 is operated to receive the signal from the wireless microphone 11 when, for example, the wireless microphone 11 is turned on or enters into the local communication area L1, or the voice receiving apparatus 100 is turned on.

In the step S11, the voice receiving apparatus 100 is operated to send request for a global identification element, hereinlater simply referred to as "global ID". The step S11 goes forward to the step S12, in which the wireless microphone 11 is operated to receive the request for a global ID and refer to own global ID, for example, global ID: A stored in the microphone storage area. The step S12 goes forward to the step S13, in which the wireless microphone 12 is operated to send the global ID: A.

The step S13 goes forward to the step S14, in which the voice receiving apparatus 100 is operated to receive the global ID: A from the wireless microphone 11, and refer to the identification table stored in the storage section 101. The step S14 goes forward to the step S15, in which the voice receiving apparatus 100 is operated to judge whether the global ID: A is included in the identification table stored in the storage section 101 or not, i.e., whether the global ID: A is a registered global ID or not. If it is judged that the global ID: A is not included in the identification table stored in the storage section 101, i.e., not a registered global ID, the step S15 goes forward to the step S18, in which the line connection with the wireless microphone 11 is refused. Otherwise, the step S15 goes forward to the step S16, in which the line connection with the wireless microphone 11 is permitted, the voice receiving apparatus 100 is operated to assign a local identification element, hereinlater simply referred to as "local ID", for example, local ID: a to the wireless microphone 11 in accordance with the global ID: A with reference to the identification table stored in the storage section 101, and issue a local ID: a to the wireless microphone 11. The step S16 goes forward to the step S17, in which the wireless microphone 11 is operated to receive the local ID: a, and write the local ID: a into the wireless microphone storage area. The wireless microphone 11 is then operated to communicate with the voice receiving apparatus 100 with the local identification element, i.e., local ID: a thus stored in the wireless microphone storage area on the communicating frequency channel corresponding to the local identification element.

In the first embodiment of the wireless microphone system 1000 thus constructed, the receiving frequency channel of the voice receiving apparatus 100 can be automatically set to a frequency channel common to the microphone frequency channel of the wireless microphone 1-*i* located in the local communication area L1, thereby making it easy for the wireless microphones 1-*i* to communicate with the voice receiving apparatus 100.

In the first embodiment of the wireless microphone system 1000 according to the present invention, a wireless microphone 20 located in, for example, both the local communication areas 1 and 3, and communicating with voice receiving apparatus, not shown, capable of communicating with a wireless microphone located in the local communication area 3 (see FIG. 1), cannot communicate with the voice receiving apparatus 100 unless the global identification element of wireless microphone 20 is registered with the voice receiving apparatus 100 and has received a local identification element, i.e., a local ID from the voice receiving apparatus 100 because of the fact that the voice receiving apparatus 100 is operated to judge that the global identification element, i.e., the global ID of the wireless microphone is not a registered global ID in the step S15, and the line connection with the wireless microphone 20 is refused in the step S18, thereby preventing the radio wave transmitted by the wireless microphone 20 from being recognized by the voice receiving apparatus 100 as extraneous radio wave and causing a harmful interference with the voice receiving apparatus 100.

The first embodiment of the wireless microphone system 1000 according to the present invention, comprising a plurality of wireless microphones 11 to 18 and a voice receiving apparatus 100 including a global identification element registering section for registering the global identification element received from a wireless microphone 1-*i*, and a local identification element assigning section for assigning a local identification element to the wireless microphone 1-*i* in accordance with the global identification element, and the wireless microphone 1-*i* is operative to receive the local identification element from the voice receiving apparatus 100 and communicate with the voice receiving apparatus 100 with the local identification element thus received, is simple in construction but makes it possible for a plurality of wireless microphones to automatically register with the voice receiving apparatus 100, thereby preventing the radio wave transmitted by other entities such as for example, digital wireless microphones and analog wireless microphones communicating with other voice receiving apparatus, and radio communication systems from being recognized by the voice receiving apparatus 100 as extraneous radio wave and causing a harmful interference with the voice receiving apparatus 100.

Figure 4:
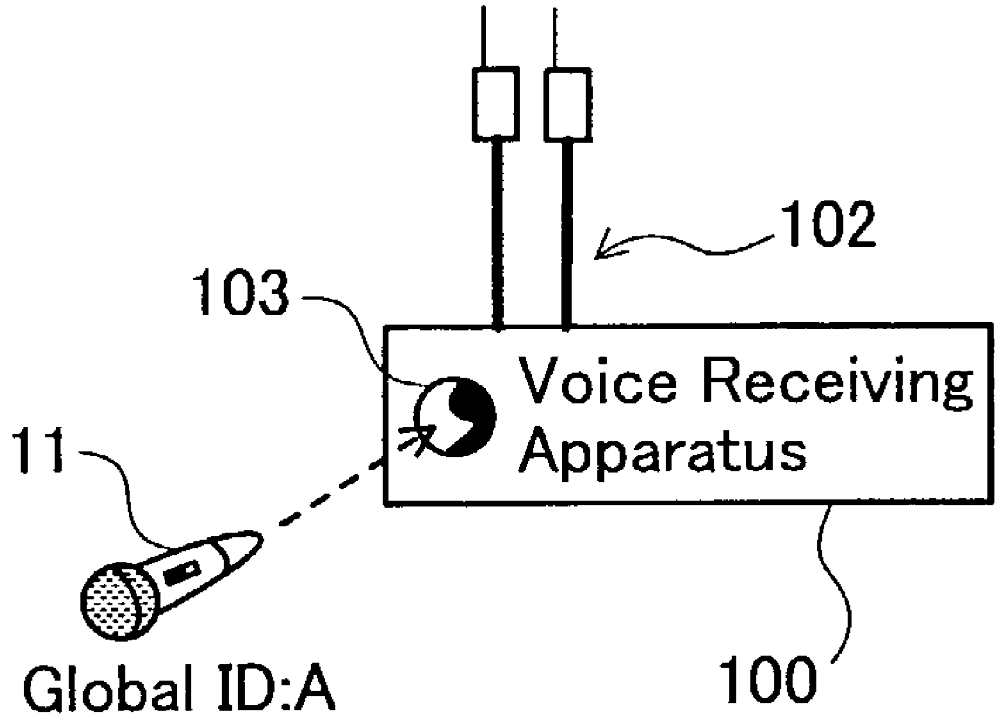
FIG. 4 is a block diagram of a wireless microphone and a voice receiving apparatus forming part of a second preferred embodiment of the wireless microphone system according to the present invention.
Figure 5:
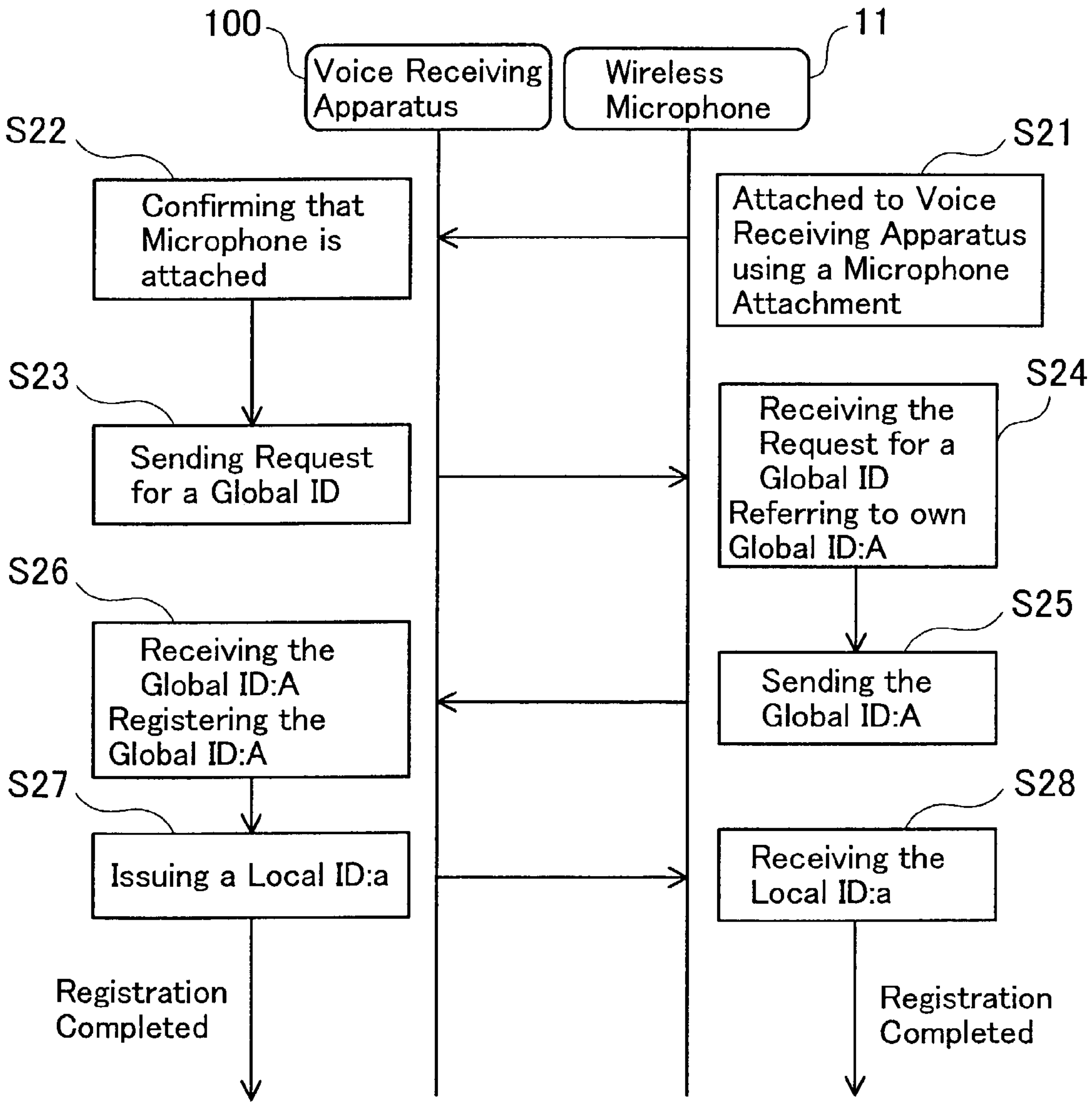
FIG. 5 is a flow chart showing a process performed in the wireless microphone system shown in FIG. 4.

Referring then to FIGS. 4 and 5 of the drawings, there is shown a second preferred embodiment of the wireless microphone system 2000 according to the present invention.

The second preferred embodiment of the wireless microphone system 2000 shown in FIG. 4 is similar to the first embodiment of the wireless microphone system 1000 except for the fact that the voice receiving apparatus 100 constituting the second embodiment of the wireless microphone system 2000 includes an attaching device 103 for removably attaching a wireless microphone to the voice receiving apparatus 100.

The constitution elements of the second embodiment of the wireless microphone system 2000 entirely the same as those of the first embodiment of the wireless microphone system 1000 will not be described but bear the same reference numerals and legends as those of the first embodiment of the wireless microphone system 1000 in FIG. 1 to avoid tedious repetition.

The wireless microphone 1-*i* is removably attached to the voice receiving apparatus 100, and operative to transmit the global identification element directly to the voice receiving apparatus 100. The voice receiving apparatus 100 is operative to receive the global identification element from the wireless microphone 1-*i*, assign a local identification element to the wireless microphone 1-*i* in accordance with the global identification element with reference to the identification table stored in the storage section 101, and transmit the local identification element to the wireless microphone 1-*i* while the wireless microphone 1-*i* is removably attached to the voice receiving apparatus 100. The wireless microphone 1-*i* is operative to receive the local identification element, store the local identification element in the microphone storage area, and communicate with the voice receiving apparatus 100 with the local identification element thus stored on the communicating frequency channel corresponding to the local identification element. It is needless to mention that the wireless microphone 1-*i* is capable of communicating with the voice receiving apparatus 100 with the local identification element on the communicating frequency channel corresponding to the local identification element after removed from the voice receiving apparatus 100. The term "wireless microphone 1-*i*" herein used is intended to mean any one of the wireless microphones 11 to 18.

The operation of the second embodiment of the wireless microphone system 2000 according to the present invention will be described with reference to the drawings shown in FIG. 5.

It is assumed that a wireless microphone, for example, wireless microphone 11, removably attached to the voice receiving apparatus 100 by the attaching device 103, is operated to transmit a global identification element and the voice receiving apparatus 100 is operated to receive the global identification element from the wireless microphone 11.

In the step S21, the wireless microphone 11 is removably attached to the voice receiving apparatus 100 by the attaching device 103, for example, a microphone attachment. The step S21 goes forward to the step S22, in which the voice receiving apparatus 11 is operated to confirm that the wireless microphone 11 is attached thereto. The step S22 goes forward to the step S23, in which the voice receiving apparatus 100 is operated to send request for a global identification element, hereinlater simply referred to as "global ID". The step S23 goes forward to the step S24, in which the wireless microphone 11 is operated to receive the request for a global ID and refer to own global ID, for example, global ID: A stored in the microphone storage area. The step S24 goes forward to the step S25, in which the wireless microphone 12 is operated to send the global ID: A.

The step S25 goes forward to the step S26, in which the voice receiving apparatus 100 is operated to receive the global ID: A from the wireless microphone 11, refer to the identification table stored in the storage section 101, and register the global ID. The step S26 goes forward to the step S27, in which the voice receiving apparatus 100 is operated to assign a local identification element, for example, a local ID: a assigned to the wireless microphone 11 according to the global ID: A with reference to the identification table stored in the storage section 101, and issue the local ID: a to the wireless microphone 11. The registration of global identification element and the registration of local identification performed in the voice receiving apparatus 100 are completed. The step S27 goes forward to the step S28, in which the wireless microphone 11 is operated to receive the local ID: a, and write the local ID: a into the wireless microphone storage area. Then, registration of global identification element and the registration of local identification performed in the wireless microphone 11 are completed. Then, the wireless microphone 1-*i* is capable of communicating with the voice receiving apparatus 100 with the local identification element on the communicating frequency channel corresponding to the local identification element after removed from the voice receiving apparatus 100.

The second embodiment of the wireless microphone system 2000 thus constructed makes it easy for the wireless microphone 11 just removably attached to the voice receiving apparatus 100 by the attaching device 103 to automatically register the global identification element, i.e., global ID with the voice receiving apparatus 100 and receive the local identification element, i.e., local ID from the voice receiving apparatus 100 without making any manual efforts such as, for example, inputting numbers.

The second embodiment of the wireless microphone system 2000 according to the present invention, makes it possible for a plurality of wireless microphones to automatically register with the voice receiving apparatus 100, thereby preventing the radio wave transmitted by other entities such as for example, digital wireless microphones and analog wireless microphones communicating with other voice receiving apparatus, and radio communication systems from being recognized by the voice receiving apparatus 100 as extraneous radio wave and causing a harmful interference with the voice receiving apparatus 100.

Figure 6:
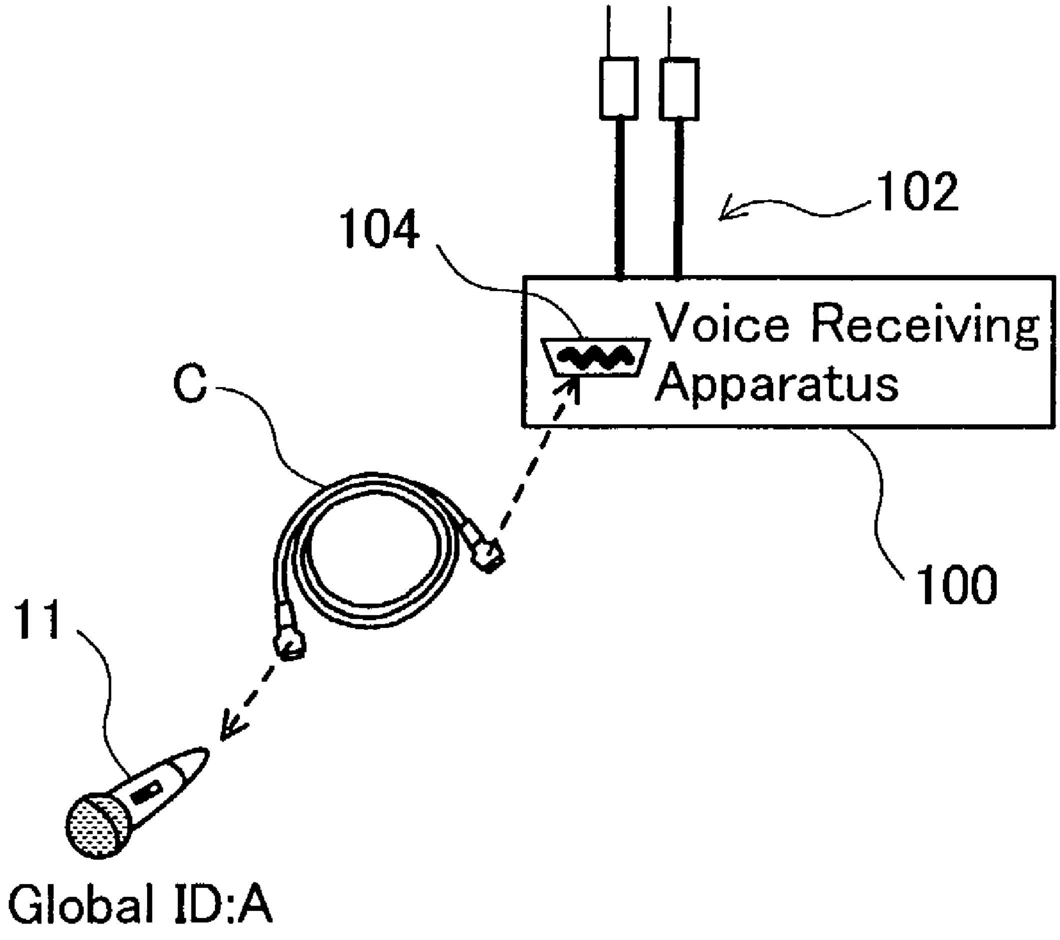
FIG. 6 is a block diagram of a wireless microphone and a voice receiving apparatus forming part of a third preferred embodiment of the wireless microphone system according to the present invention.
Figure 7:
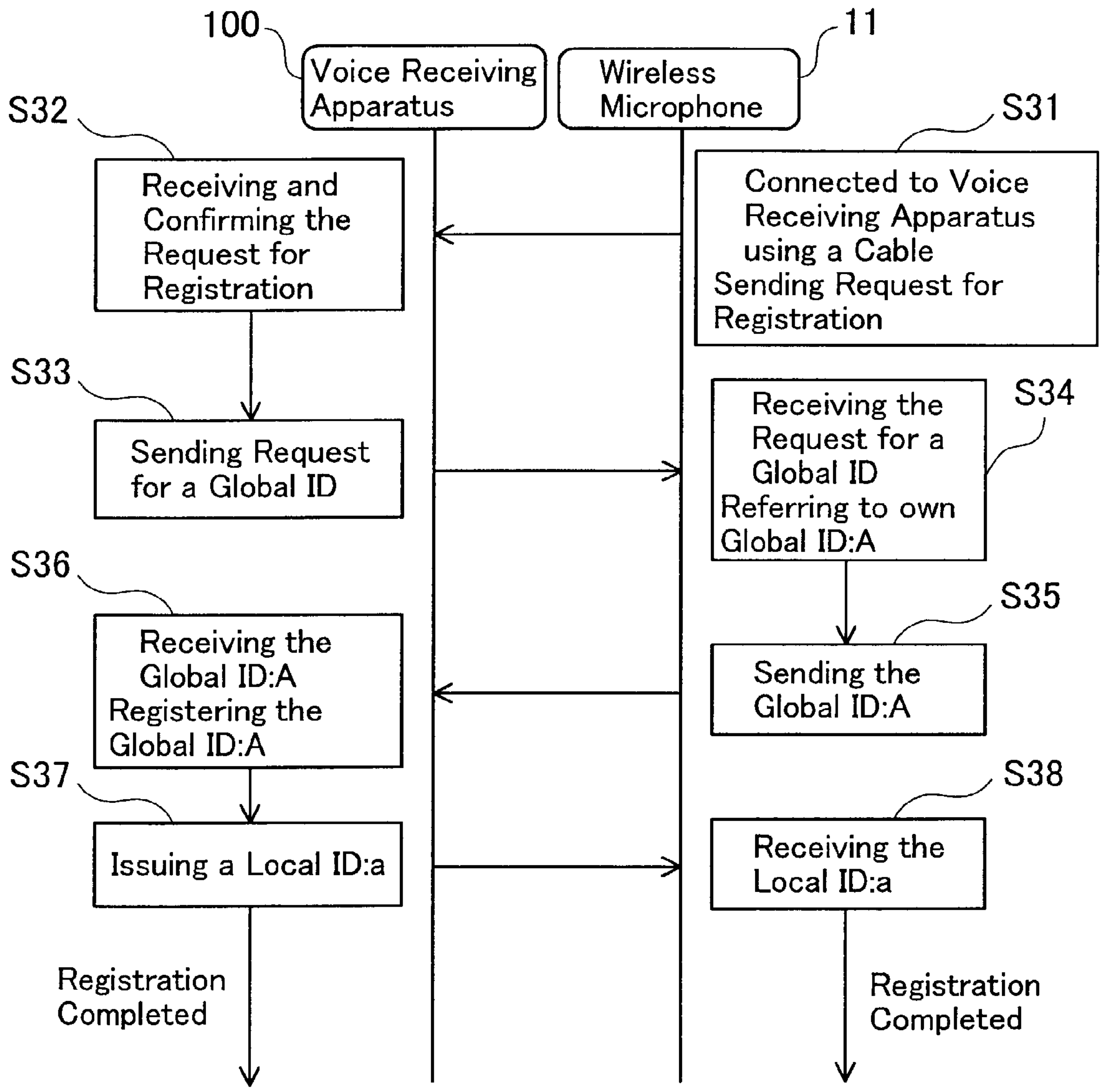
FIG. 7 is a flow chart showing a process performed in the wireless microphone system shown in FIG. 6.

Referring to FIGS. 6 and 7 of the drawings, there is shown a third preferred embodiment of the wireless microphone system 3000 according to the present invention.

The third preferred embodiment of the wireless microphone system 3000 shown in FIG. 6 is similar to the first embodiment of the wireless microphone system 1000 except for the fact that the voice receiving apparatus 100 includes a connecting port 104, and wireless microphone 1-*i* is removably connected with the voice receiving apparatus 100 through a cable C connected to the connecting port 104.

The constitution elements of the third embodiment of the wireless microphone system 3000 entirely the same as those of the first embodiment of the wireless microphone system 1000 will not be described but bear the same reference numerals and legends as those of the first embodiment of the wireless microphone system 1000 in FIG. 1 to avoid tedious repetition. The wireless microphone 1-*i* is removably connected with the voice receiving apparatus 100 through a cable C and operative to transmit the global identification element through the cable C to the voice receiving apparatus 100. The voice receiving apparatus 100 is operative to receive the global identification element from the wireless microphone 1-*i*, assign a local identification element to the wireless microphone 1-*i* in accordance with the global identification element with reference to the identification table stored in the storage section 101, and transmit the local identification element to the wireless microphone 1-*i* through the cable C while the wireless microphone 1-*i* is removably connected with the voice receiving apparatus 100 through the cable C. The wireless microphone 1-*i* is operative to receive the local identification element, store the local identification element in the microphone storage area, and communicate with the voice receiving apparatus 100 with the local identification element thus stored on the communicating frequency channel corresponding to the local identification element. It is needless to mention that the wireless microphone 1-*i* is capable of communicating with the voice receiving apparatus 100 with the local identification element on the communicating frequency channel corresponding to the local identification element after the cable C connecting the wireless microphone 1-*i* and the voice receiving apparatus 100 is removed.

The operation of the third embodiment of the wireless microphone system 3000 according to the present invention will be described with reference to the drawings shown in FIG. 7.

It is assumed that a wireless microphone, for example, wireless microphone 11, removably connected with the voice receiving apparatus 100 through a cable C connected to the connecting port 104 of the voice receiving apparatus 100, is operated to transmit a global identification element and the voice receiving apparatus 100 is operated to receive the global identification element from the wireless microphone 11.

In the step S31, the wireless microphone 11 is removably connected with the voice receiving apparatus 100 using the cable C connected to the connecting port 104 of the voice receiving apparatus 100, and operated to send request for registration. The step S31 goes forward to the step S32, in which the voice receiving apparatus 11 is operated to receive and confirm the request for registration. The step S32 goes forward to the step S33, in which the voice receiving apparatus 100 is operated to send request for a global identification element, hereinlater simply referred to as "global ID". The step S33 goes forward to the step S34, in which the wireless microphone 11 is operated to receive the request for a global ID and refer to own global ID, for example, global ID: A stored in the microphone storage area. The step S34 goes forward to the step S35, in which the wireless microphone 12 is operated to send the global ID: A.

The step S35 goes forward to the step S36, in which the voice receiving apparatus 100 is operated to receive the global ID: A from the wireless microphone 11, refer to the identification table stored in the storage section 101, and register the global ID. The step S36 goes forward to the step S37, in which the voice receiving apparatus 100 is operated to assign a local identification element, for example, a local ID: a assigned to the wireless microphone 11 according to the global ID: A with reference to the identification table stored in the storage section 101, and issue the local ID: a to the wireless microphone 11. The step S37 goes forward to the step S38, in which the wireless microphone 11 is operated to receive the local ID: a, and write the local ID: a into the wireless microphone storage area. Then the registration process is completed.

The third embodiment of the wireless microphone system 3000 thus constructed makes it possible for the wireless microphone 11 just removably connected to the voice receiving apparatus 100 through the cable C connected to the connecting port 104 of the voice receiving apparatus 100 to automatically register the global identification element, i.e., global ID with the voice receiving apparatus 100 and receive the local identification element, i.e., local ID from the voice receiving apparatus 100 without making any manual efforts such as, for example, inputting numbers.

Figure 8:
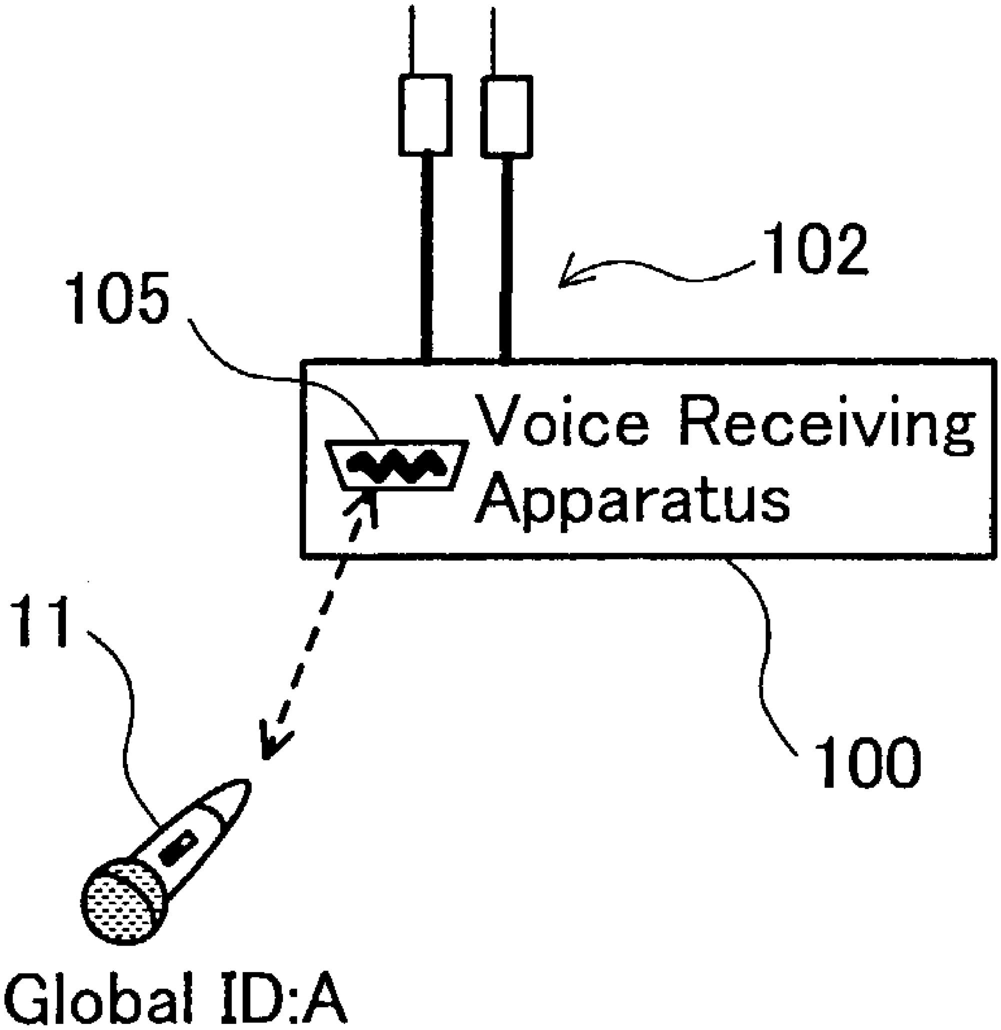
FIG. 8 is a block diagram of a wireless microphone and a voice receiving apparatus forming part of a fourth preferred embodiment of the wireless microphone system according to the present invention.
Figure 9:
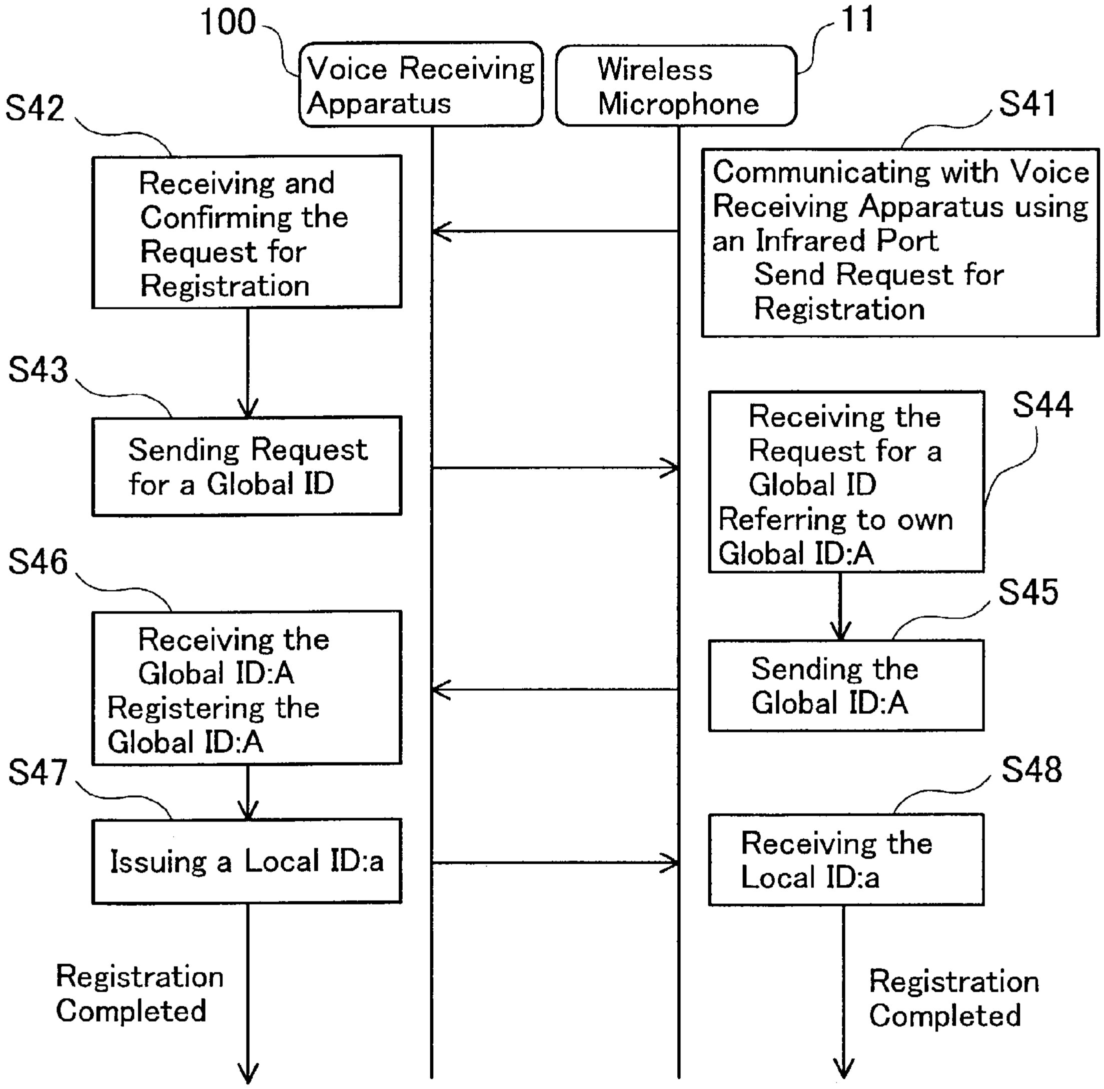
FIG. 9 is a flow chart showing a process performed in the wireless microphone system shown in FIG. 8.

Referring to FIGS. 8 and 9 of the drawings, there is shown a fourth preferred embodiment of the wireless microphone system 4000 according to the present invention.

The fourth preferred embodiment of the wireless microphone system 4000 shown in FIG. 8 is similar to the first embodiment of the wireless microphone system 1000 except for the fact that the voice receiving apparatus 100 includes an infrared communication port 105 for transmitting and receiving signals by means of infrared communication, and the wireless microphone 1-*i* is capable of communicating with the voice receiving apparatus 100 by means of infrared communication through the infrared communication port 105. This means that the local identification element assigning section of the voice receiving apparatus 100 is operative to receive the global identification element from a wireless microphone 1-*i* and transmit the local identification element to the wireless microphone 1-*i* by means of infrared communication. The infrared communication port 105 partly constitutes the local identification element assigning section according to the present invention.

The constitution elements of the fourth embodiment of the wireless microphone system 4000 entirely the same as those of the first embodiment of the wireless microphone system 1000 will not be described but bear the same reference numerals and legends as those of the first embodiment of the wireless microphone system 1000 in FIG. 1 to avoid tedious repetition.

The wireless microphone 1-*i* is capable of communicating with the voice receiving apparatus 100 by means of infrared communication through the infrared communication port 105, and operative to transmit the global identification element by means of infrared communication to the voice receiving apparatus 100. The voice receiving apparatus 100 is operative to receive the global identification element from the wireless microphone 1-*i*, assign a local identification element to the wireless microphone 1-*i* in accordance with the global identification element with reference to the identification table stored in the storage section 101, and transmit the local identification element to the wireless microphone 1-*i* by means of infrared communication through the infrared communication port 105. The wireless microphone 1-*i* is operative to receive the local identification element, store the local identification element in the microphone storage area, and communicate with the voice receiving apparatus 100 with the local identification element thus stored on the communicating frequency channel corresponding to the local identification element.

The operation of the fourth embodiment of the wireless microphone system 4000 according to the present invention will be described with reference to the drawings shown in FIG. 9.

It is assumed that a wireless microphone, for example, wireless microphone 11, attempts to communicate with the voice receiving apparatus 100, and is operated to transmit a global identification element by means of infrared communication, and the voice receiving apparatus 100 is operated to receive the global identification element by means of infrared communication through the infrared communication port 105.

In the step S41, the wireless microphone 11 is operated to communicate with the voice receiving apparatus 100 using the infrared port 105 of the voice receiving apparatus 100, and send request for registration. The step S41 goes forward to the step S42, in which the voice receiving apparatus 11 is operated to receive and confirm the request for registration. The step S42 goes forward to the step S43, in which the voice receiving apparatus 100 is operated to send request for a global identification element, hereinlater simply referred to as "global ID". The step S43 goes forward to the step S44, in which the wireless microphone 11 is operated to receive the request for a global ID and refer to own global ID, for example, global ID: A stored in the microphone storage area. The step S44 goes forward to the step S45, in which the wireless microphone 12 is operated to send the global ID: A.

The step S45 goes forward to the step S46, in which the voice receiving apparatus 100 is operated to receive the global ID: A from the wireless microphone 11, refer to the identification table stored in the storage section 101, and register the global ID. The step S46 goes forward to the step S47, in which the voice receiving apparatus 100 is operated to assign a local identification element, for example, a local ID: a assigned to the wireless microphone 11 according to the global ID: A with reference to the identification table stored in the storage section 101, and issue the local ID: a to the wireless microphone 11. The step S47 goes forward to the step S48, in which the wireless microphone 11 is operated to receive the local ID: a, and write the local ID: a into the wireless microphone storage area. Then the registration process is completed.

The fourth embodiment of the wireless microphone system 4000 thus constructed makes it possible for the wireless microphone 1-*i* capable of communicating with the voice receiving apparatus 100 by means of infrared communication through the infrared communication port 105 to automatically register the global identification element, i.e., global ID with the voice receiving apparatus 100 and receive the local identification element, i.e., local ID from the voice receiving apparatus 100 without making any manual efforts such as, for example, inputting numbers.

Furthermore, the directivity of the infrared wave is higher than that of the radio wave. This means that the fourth embodiment of the wireless microphone system 4000, in which the wireless microphone 1-*i* is capable of communicating with the voice receiving apparatus 100 by means of infrared communication, makes it possible for the wireless microphone 1-*i* to automatically register the global identification element and receive the local identification element by means of infrared waves, regardless of whether extraneous radio waves are transmitted or not.

Figure 10:
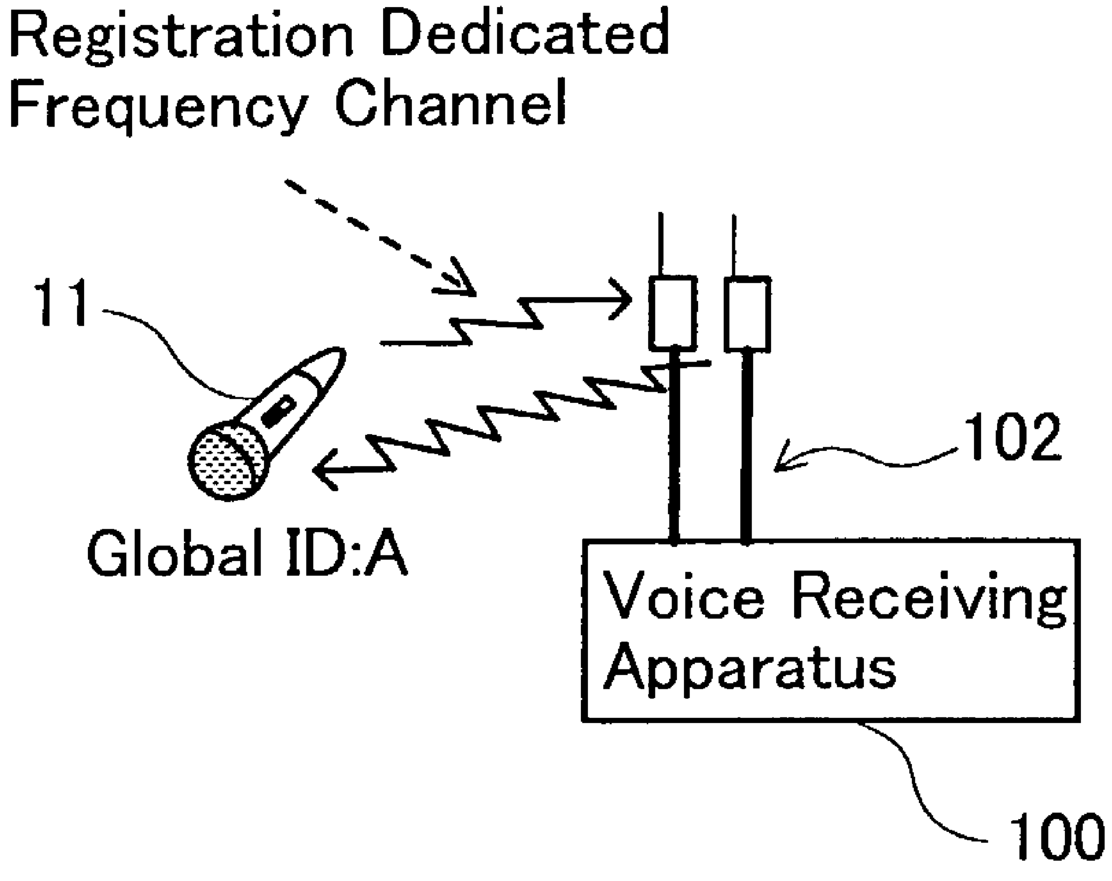
FIG. 10 is a block diagram of a wireless microphone and a voice receiving apparatus forming part of a fifth preferred embodiment of the wireless microphone system according to the present invention.
Figure 11:
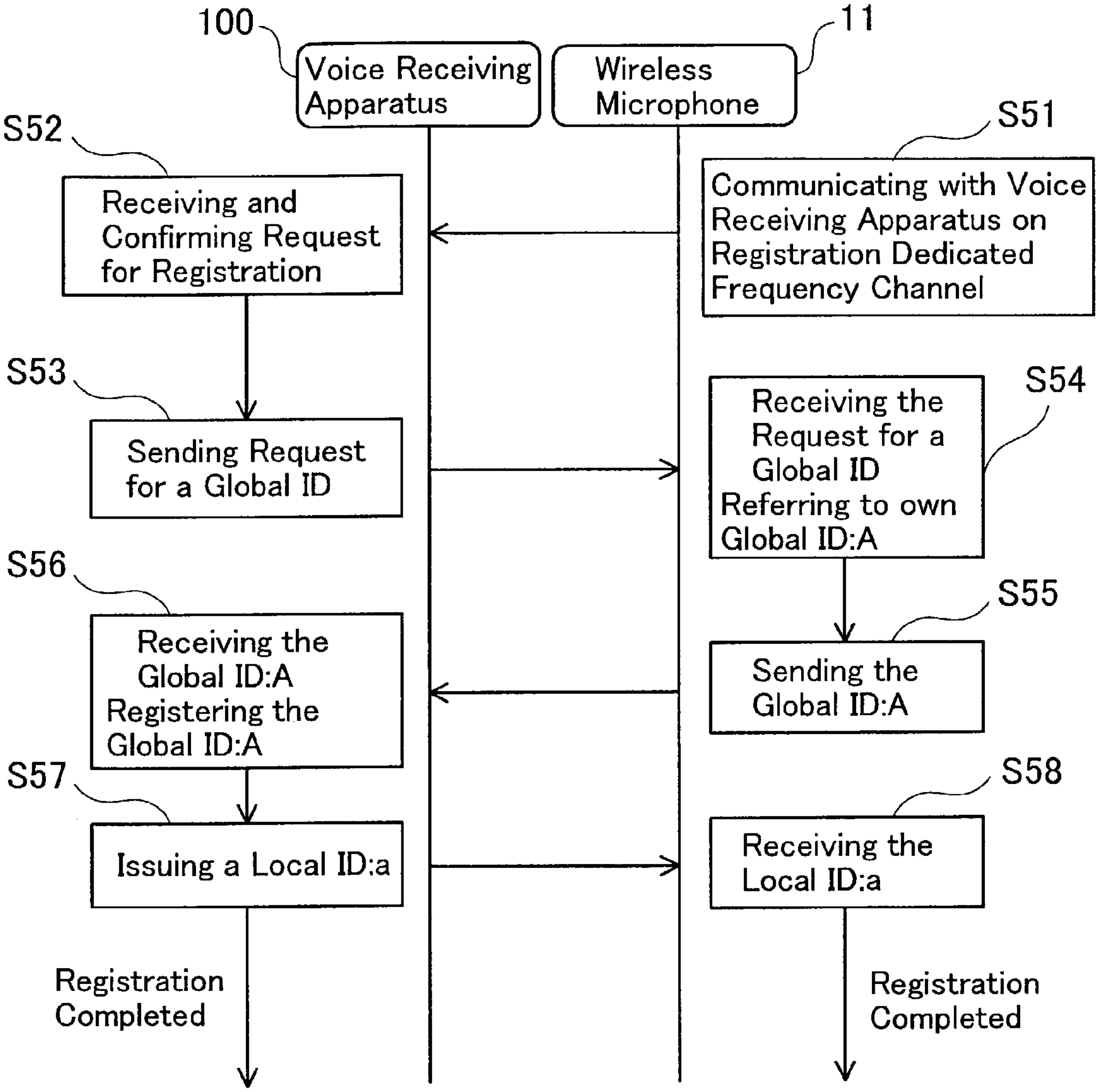
FIG. 11 is a flow chart showing a process performed in the wireless microphone system shown in FIG. 10.

Referring to FIGS. 10 and 11 of the drawings, there is shown a fifth preferred embodiment of the wireless microphone system 5000 according to the present invention.

The fifth preferred embodiment of the wireless microphone system 5000 shown in FIG. 10 is similar to the first embodiment of the wireless microphone system 1000 except for the fact that the wireless microphone 1-*i* is operative to transmit the global identification element on a predetermined frequency channel; and the voice receiving apparatus 100 is operative to assign a local identification element to the wireless microphone 1-*i* in accordance with the global identification element with reference to the identification table stored in the storage section 101, and transmit the local identification element to the wireless microphone 1-*i* on the predetermined frequency channel. This means that the local identification element assigning section is operative to receive the global identification element from a wireless microphone 1-*i* and transmit the local identification element to the wireless microphone 1-*i* by means of radio wave communication on the particular frequency channel.

The constitution elements of the fifth embodiment of the wireless microphone system 5000 entirely the same as those of the first embodiment of the wireless microphone system 1000 will not be described but bear the same reference numerals and legends as those of the first embodiment of the wireless microphone system 1000 in FIG. 1 to avoid tedious repetition.

The wireless microphone 1-*i* is operative to transmit the global identification element on a predetermined frequency channel, for example, a registration dedicated frequency channel. The voice receiving apparatus 100 is operative to assign a local identification element to the wireless microphone 1-*i* in accordance with the global identification element with reference to the identification table stored in the storage section 101, and transmit the local identification element to the wireless microphone 1-*i* on the predetermined frequency channel, i.e., a registration dedicated frequency channel. The wireless microphone 1-*i* is operative to receive the local identification element, store the local identification element in the microphone storage area, and communicate with the voice receiving apparatus 100 with the local identification element thus stored on the communicating frequency channel corresponding to the local identification element.

The operation of the fifth embodiment of the wireless microphone system 5000 according to the present invention will be described with reference to the drawings shown in FIG. 11.

It is assumed that a wireless microphone, for example, wireless microphone 11, attempts to communicate with the voice receiving apparatus 100, and is operative to transmit the global identification element on a predetermined frequency channel, and the voice receiving apparatus 100 is operative to assign a local identification element to the wireless microphone 11 in accordance with the global identification element with reference to the identification table stored in the storage section 101, and transmit the local identification element to the wireless microphone 11 on the predetermined frequency channel.

In the step S51, the wireless microphone 11 is operated to communicate with the voice receiving apparatus 100 on a predetermined frequency channel, hereinlater referred to as, “registration dedicated frequency channel”, and send request for registration. The step S51 goes forward to the step S52, in which the voice receiving apparatus 11 is operated to receive and confirm the request for registration. The step S52 goes forward to the step S53, in which the voice receiving apparatus 100 is operated to send request for a global identification element, hereinlater simply referred to as “global ID”. The step S53 goes forward to the step S54, in which the wireless microphone 11 is operated to receive the request for a global ID and refer to own global ID, for example, global ID: A stored in the microphone storage area. The step S54 goes forward to the step S55, in which the wireless microphone 12 is operated to send the global ID: A.

The step S55 goes forward to the step S56, in which the voice receiving apparatus 100 is operated to receive the global ID: A from the wireless microphone 11, refer to the identification table stored in the storage section 101, and register the global ID. The step S56 goes forward to the step S57, in which the voice receiving apparatus 100 is operated to assign a local identification element, for example, a local ID: a assigned to the wireless microphone 11 according to the global ID: A with reference to the identification table stored in the storage section 101, and issue the local ID: a to the wireless microphone 11. The step S57 goes forward to the step S58, in which the wireless microphone 11 is operated to receive the local ID: a, and write the local ID: a into the wireless microphone storage area. Then the registration process is completed.

The fifth embodiment of the wireless microphone system 5000 thus constructed makes it possible for the wireless microphone 1-*i* capable of communicating with the voice receiving apparatus 100 on a predetermined frequency channel to automatically register the global identification element, i.e., global ID with the voice receiving apparatus 100 and receive the local identification element, i.e., local ID from the voice receiving apparatus 100 without making any manual efforts such as, for example, inputting numbers.

Furthermore, the fifth embodiment of the wireless microphone system 500 according to the present invention, in which the wireless microphone 1-*i* is operative to transmit the global identification element on a predetermined frequency channel; and the voice receiving apparatus 100 is operative to assign a local identification element to the wireless microphone 1-*i* in accordance with the global identification element with reference to the identification table stored in the storage section 101, and transmit the local identification element to the wireless microphone 1-*i* on the predetermined frequency channel, makes it possible for the wireless microphone 1-*i* to automatically register the global identification element with the voice receiving apparatus 100 and receive the local identification element from the voice receiving apparatus 100 on a predetermined frequency channel, eliminating the need of installing additional devices such as, for example, a attaching device, and infrared communication devices, thereby reducing the cost of the wireless microphone system 5000.

It is herein assumed that the above embodiments of the wireless microphone system comprises 8 units of wireless microphones, for example, wireless microphones 11 to 18 for simplicity and better understanding but it is of course needless to mention that the wireless microphone system according to the present invention may comprise any number of wireless microphones.

Figure 12:
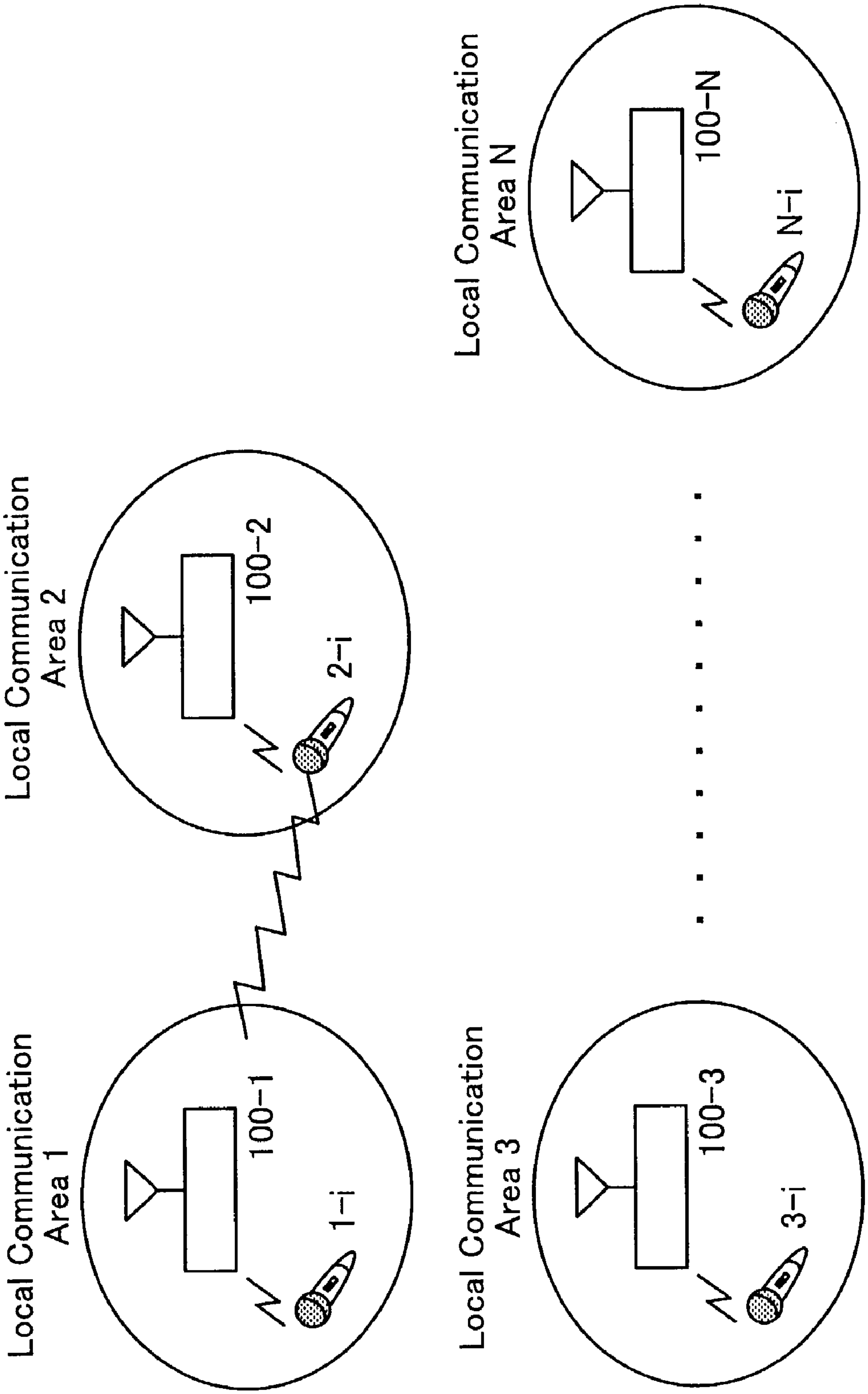
FIG. 12 is a schematic block diagram of sixth preferred embodiment of the wireless microphone systems according to the present invention.
Figure 13:
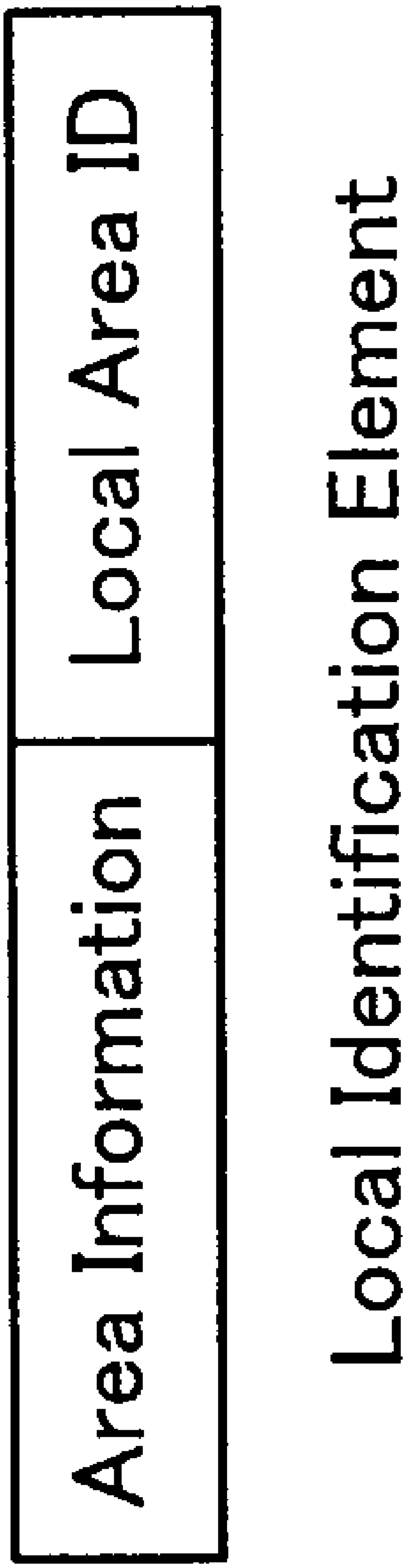
FIG. 13 is a block diagram explaining the structure of a local identification element forming part of the wireless microphone system shown in FIG. 12.
Figure 14:
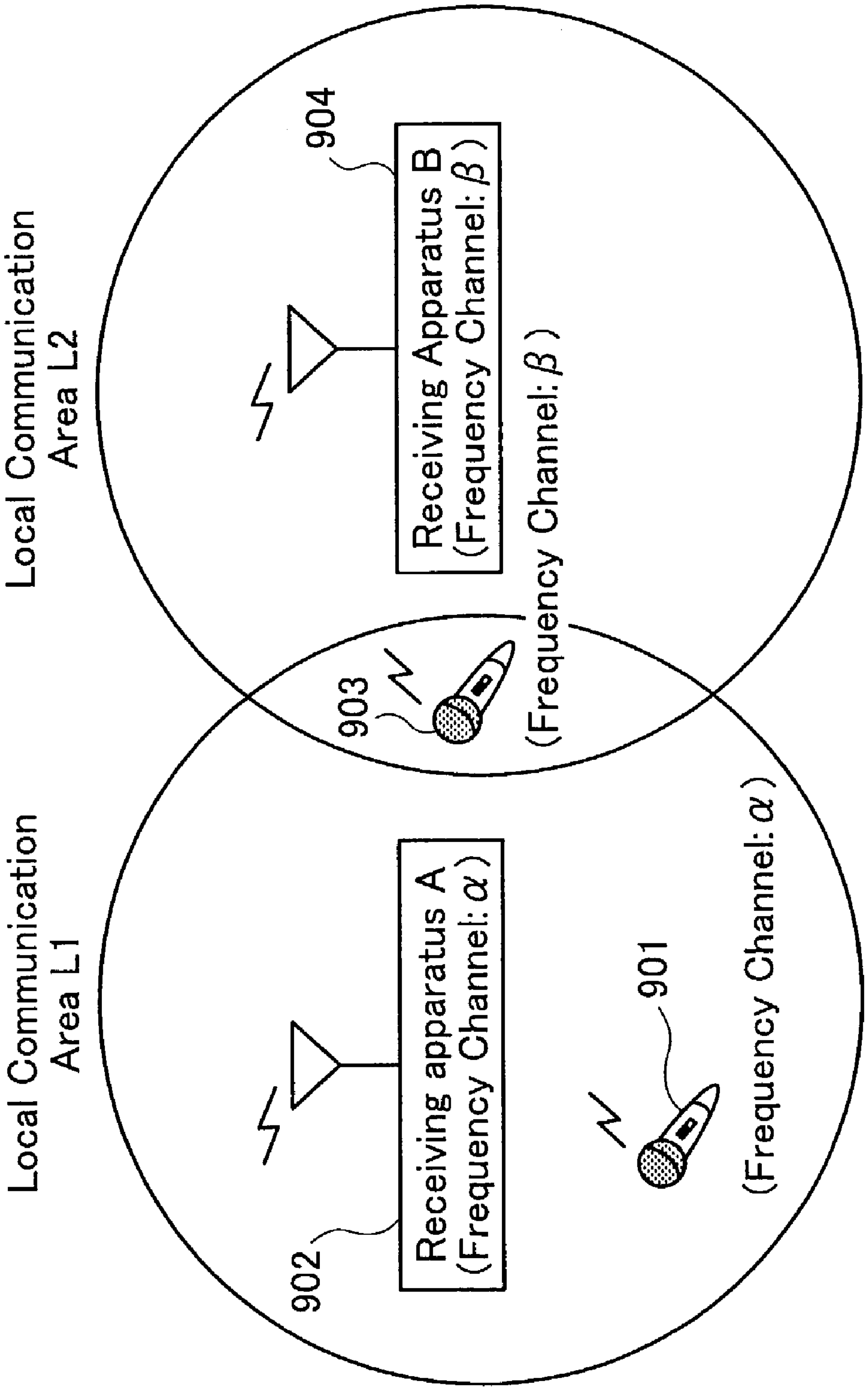
FIG.14 PRIOR ART
FIG. 14 is a schematic block diagram of a first conventional wireless microphone system.
Figure 15:
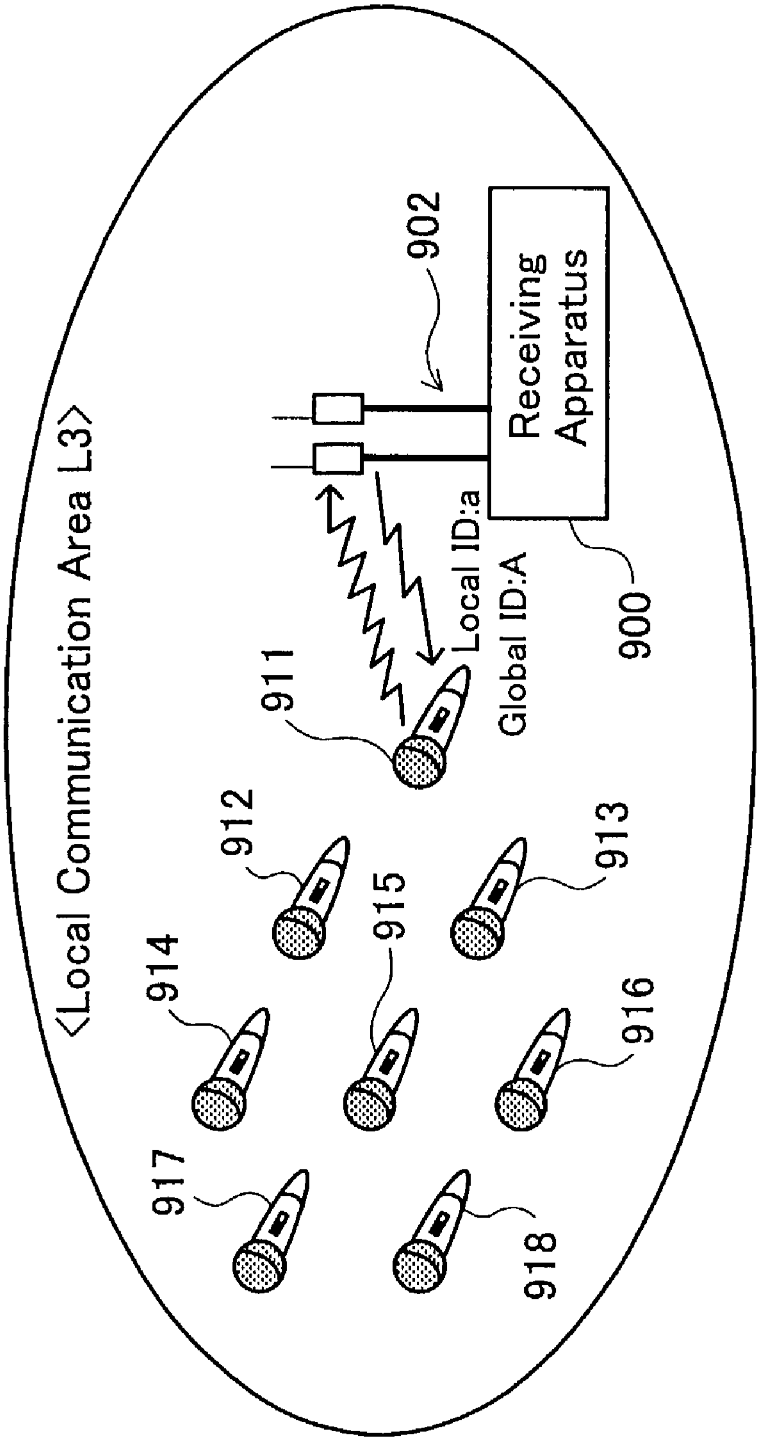
FIG.15 PRIOR ART
FIG. 15 is a schematic block diagram of a second conventional wireless microphone system.

Referring to FIG. 12 and 13 of the drawings, there are shown a plurality of sixth preferred embodiments of the wireless microphone system according to the present invention.

The sixth preferred embodiment of the wireless microphone system shown in FIG. 12 is similar to the first embodiment of the wireless microphone system 1000 except for the fact that the voice receiving apparatus 100 is capable of communicating with a wireless microphone in a local communication area, and the local identification element included in the identification table stored in the storage section 101 includes area information indicative of the local communication area.

The constitution elements of the sixth embodiment of the wireless microphone system entirely the same as those of the first embodiment of the wireless microphone system will not be described but bear the same reference numerals and legends as those of the first embodiment of the wireless microphone system 1000 in FIG. 1 to avoid tedious repetition. As best shown in FIG. 12, each of the wireless microphone systems comprises a voice receiving apparatus and a plurality of wireless microphones. The voice receiving apparatus 100-1 is capable of communicating with a wireless microphone 1-*i* located in a local communication area 1. The local identification element included in the identification table stored in the storage section 101 includes area information indicative of the local communication area as shown in FIG. 13. The local identification element stored in the storage section 101 of the voice receiving apparatus 100-1 includes area information indicative of the local communication area 1, for example, "01". The voice receiving apparatus 100-2 is capable of communicating with a wireless microphone 2-*i* located in a local communication area 2. The local identification element stored in the storage section 101 of the voice receiving apparatus 100-2 includes area information indicative of the local communication area 2, for example, "02". Similarly, the voice receiving apparatus 100-N is capable of communicating with a wireless microphone N-i located in a local communication area N. The local identification element stored in the storage section 101 of the voice receiving apparatus 100-N includes area information indicative of the local communication area N, for example, "N". Upon receiving an audio signal with a local identification element, the voice receiving apparatus 100-N is operative to judge whether the local identification element is valid or not with reference to the area information included in the local identification element and refuse the line connection with the wireless microphone if it is judged that the local identification element is not valid.

The operation of the sixth embodiment of the wireless microphone system will be described hereinlater with reference to the drawings shown in FIG. 12.

The voice receiving apparatus, for example, voice receiving apparatus 100-1 is operated to receive a local identification element from a wireless microphone, for example, wireless microphone 2-*i* communicating with a voice receiving apparatus 100-2. The local identification element transmitted by the wireless microphone 2-*i* start from the area information "02" indicative of a local communication area 2. The voice receiving apparatus 100-1 is operated to judge whether the local identification element is valid or not with reference to the area information "02" included in the local identification element. The voice receiving apparatus 100-1 is capable of communicating with a wireless microphone 1-*i* transmitting a local identification element starting from the area information "01" but not with a wireless microphone transmitting a local identification element starting from the area information "02", which is other than "01". The voice receiving apparatus 100-1 is operated to judge that the local identification element received from the wireless microphone 2-*i* is not valid and the line connection with the wireless microphone 2-*i* is refused.

The sixth embodiment of the wireless microphone system according to the present invention, in which the voice receiving apparatus capable of communicating with a wireless microphone in a local communication area judges whether a local identification element transmitted from a wireless microphone is valid in the local communication area or not with reference to the area information included in the local identification element, and refuse the line connection if it is judged that the local identification element is not valid, can prevent the radio wave transmitted by an alien wireless microphone, which is supposed to communicate with other voice receiving apparatus, from being recognized by the voice receiving apparatus 100 as extraneous radio wave and causing a harmful interference with the voice receiving apparatus 100.

As will be seen from the foregoing description, it is to be understood that the wireless microphone system according to the present invention, comprising a voice receiving apparatus and a plurality of wireless microphones located in a local communication area wherein the voice receiving apparatus is capable of communicating with each of the wireless microphones located in the local communication area, makes it easy to set the receiving frequency channel of the voice receiving apparatus to frequency channels common to the microphone frequency channels of the wireless microphones so that a plurality of wireless microphones could communicate with the voice receiving apparatus to ensure reliable communications, thereby enabling to manage a plurality of wireless microphones in terms of frequency channels and preventing harmful interferences from occurring.

Furthermore, the voice receiving apparatus according to the present invention, capable of communicating with a plurality of wireless microphones located in a local communication area, makes it easy to set the receiving frequency channel of the voice receiving apparatus to frequency channels common to the microphone frequency channels of the wireless microphones so that a plurality of wireless microphones could communicate with the voice receiving apparatus to ensure reliable communications, thereby enabling to manage a plurality of wireless microphones in terms of frequency channels and preventing harmful interferences from occurring.

According to the present invention, the wireless microphone capable of communicating with a voice receiving apparatus, makes it easy to set the receiving frequency channel of the voice receiving apparatus to frequency channels common to the microphone frequency channels of the wireless microphones to ensure reliable communications, thereby preventing harmful interferences from occurring.

It will be apparent to those skilled in the art and it is contemplated that variations and/or changes in the embodiments illustrated and described herein may be without departure from the present invention. Accordingly, it is intended that the foregoing description is illustrative only, not limiting, and that the true spirit and scope of the present invention will be determined by the appended claims.

What is claimed is:

1. A wireless microphone system comprising:

a plurality of wireless microphones each having a microphone storage area having a unique global identification element stored therein, each of said wireless microphones operative to collect a voice, convert said voice thus collected into an audio signal, and transmit said audio signal and said global identification element; and a voice receiving apparatus for receiving said audio signal and said global identification element from a wireless microphone, whereby said voice receiving apparatus includes a storage section for storing an identification table including a plurality of local identification elements in association with a plurality of global identification elements, said voice receiving apparatus is operative to assign a local identification element to said wireless microphone in accordance with said global identification element with reference to said identification table stored in said storage section, and transmit said local identification element to said wireless microphone, said wireless microphone is operative to receive said local identification element, store said local identification element in said microphone storage area, and communicate with said voice receiving apparatus with said local identification element thus stored, and said voice receiving apparatus is operative to judge whether or not said global identification element is included in said identification table stored in said storage section before assigning a local identification element to said wireless microphone in accordance with said global identification element, and refuse the line connection with said wireless microphone if it is judged that said global identification element is not stored in said storage section.

2. A wireless microphone system comprising:

a plurality of wireless microphones each having a microphone storage area having a unique global identification element stored therein, each of said wireless microphones operative to collect a voice, convert said voice thus collected into an audio signal, and transmit said audio signal and said global identification element; and a voice receiving apparatus for receiving said audio signal and said global identification element from a wireless microphone, whereby said voice receiving apparatus includes a storage section for storing an identification table including a plurality of local identification elements in association with a plurality of global identification elements, said voice receiving apparatus is operative to assign a local identification element to said wireless microphone in accordance with said global identification element with reference to said identification table stored in said storage section, and transmit said local identification element to said wireless microphone, said wireless microphone is operative to receive said local identification element, store said local identification element in said microphone storage area, and communicate with said voice receiving apparatus with said local identification element thus stored, said voice receiving apparatus is capable of communicating with said wireless microphone in a local communication area, said local identification element included in said identification table stored in said storage section includes area information indicative of said local communication area, and said voice receiving apparatus is operative to judge whether said local identification element is valid or not with reference to said area information included in said local identification element and refuse the line connection with said wireless microphone if it is judged that said local identification element is not valid.

3. A voice receiving apparatus for receiving an audio signal and a global identification element from a wireless microphone comprising a storage section for storing an identification table including a plurality of local identification elements in association with a plurality of global identification elements, and in which said voice receiving apparatus is operative to assign a local identification element to said wireless microphone in accordance with said global identification element with reference to said identification table stored in said storage section, and transmit said local identification element to said wireless microphone, and said voice receiving apparatus is operative to judge whether or not said global identification element is included in said identification table stored in said storage section before assigning a local identification element to said wireless microphone in accordance with said global identification element, and refuse the line connection with said wireless microphone if it is judged that said global identification element is not stored in said storage section.

4. A voice receiving apparatus for receiving an audio signal and a global identification element from a wireless microphone comprising a storage section for storing an identification table including a plurality of local identification elements in association with a plurality of global identification elements, and in which said voice receiving apparatus is operative to assign a local identification element to said wireless microphone in accordance with said global identification element with reference to said identification table stored in said storage section, and transmit said local identification element to said wireless microphone.

said voice receiving apparatus is capable of communicating with said wireless microphone in a local communication area, said local identification element included in said identification table stored in said storage section includes area information indicative of said local communication area, and said voice receiving apparatus is operative to judge whether said local identification element is valid or not with reference to said area information included in said local identification element and refuse the line connection with said wireless microphone if it is judged that said local identification element is not valid.

5. A wireless microphone system as set forth in claim 1, in which said local identification element assigning section is operative to receive said global identification element from a wireless microphone and transmit said local identification element to said wireless microphone by means of infrared communication.

6. A wireless microphone system as set forth in claim 1, in which said local identification element assigning section is operative to receive said global identification element from a wireless microphone and transmit said local identification element to said wireless microphone by means of radio wave communication on a particular frequency.

7. A wireless microphone system as set forth in claim 1, in which said wireless microphone is removably attached to said voice receiving apparatus, and operative to transmit said global identification element directly to said voice receiving apparatus, said voice receiving apparatus is operative to receive said global identification element from said wireless microphone, assign a local identification element to said wireless microphone in accordance with said global identification element with reference to said identification table stored in said storage section, and transmit said local identification element to said wireless microphone while said wireless microphone is removably attached to said voice receiving apparatus, and said wireless microphone is operative to receive said local identification element, store said local identification element in said microphone storage area, and communicate with said voice receiving apparatus with said local identification element thus stored.

8. A wireless microphone system as set forth in claim 1, in which said wireless microphone is removably connected with said voice receiving apparatus through a cable and operative to transmit said global identification element through said cable to said voice receiving apparatus, said voice receiving apparatus is operative to receive said global identification element from said wireless microphone, assign a local identification element to said wireless microphone in accordance with said global identification element with reference to said identification table stored in said storage section, and transmit said local identification element to said wireless microphone through said cable, and said wireless microphone is operative to receive said local identification element, store said local identification element in said microphone storage area, and communicate with said voice receiving apparatus with said local identification element thus stored.

9. A wireless microphone system as set forth in claim 1, in which said wireless microphone is capable of communicating with said voice receiving apparatus by means of infrared communication, and operative to transmit said global identification element by means of infrared communication to said voice receiving apparatus, said voice receiving apparatus is operative to receive said global identification element from said wireless microphone, assign a local identification element to said wireless microphone in accordance with said global identification element with reference to said identification table stored in said storage section, and transmit said local identification element to said wireless microphone by means of infrared communication, and said wireless microphone is operative to receive said local identification element, store said local identification element in said microphone storage area, and communicate with said voice receiving apparatus with said local identification element thus stored.

10. A wireless microphone system as set forth in claim 1, in which said wireless microphone is operative to transmit said global identification element on a predetermined frequency channel, said voice receiving apparatus is operative to assign a local identification element to said wireless microphone in accordance with said global identification element with reference to said identification table stored in said storage section, and transmit said local identification element to said wireless microphone on said predetermined frequency channel, and said wireless microphone is operative to receive said local identification element, store said local identification element in said microphone storage area, and communicate with said voice receiving apparatus with said local identification element thus stored.

11. A wireless microphone system as set forth in claim 1, in which each of said local identification elements included in said identification table stored in said storage section corresponds to a communicating frequency channel which a wireless microphone assigned to said local identification element uses to communicate with said voice receiving apparatus, said wireless microphone is operative to receive said local identification element, store said local identification element in said microphone storage area, and communicate with said voice receiving apparatus with said local identification element thus stored on said communicating frequency channel corresponding to said local identification element.

* * * * *

UNITED STATES PATENT AND TRADEMARK OFFICE

CERTIFICATE OF CORRECTION

PATENT NO. : 6,987,949 B2 
DATED : January 17, 2006
INVENTOR(S) : Shohei Taniguchi et al.

It is certified that error appears in the above-identified patent and that said Letters Patent is hereby corrected as shown below:

Column 20,
Line 15, delete "." and insert -- , --.

Signed and Sealed this

Twenty-third Day of May, 2006

JON W. DUDAS
*Director of the United States Patent and Trademark Office*